United States Patent
Glasco et al.

(10) Patent No.: US 7,281,055 B2
(45) Date of Patent: Oct. 9, 2007

(54) ROUTING MECHANISMS IN SYSTEMS HAVING MULTIPLE MULTI-PROCESSOR CLUSTERS

(75) Inventors: David Brian Glasco, Austin, TX (US);
Carl Zeitler, Tomball, TX (US);
Rajesh Kota, Austin, TX (US); Guru Prasadh, Austin, TX (US); Richard R. Oehler, Somers, NY (US)

(73) Assignee: Newisys, Inc., Austin, TX (US)

( * ) Notice: Subject to any disclaimer, the term of this patent is extended or adjusted under 35 U.S.C. 154(b) by 797 days.

(21) Appl. No.: 10/156,893

(22) Filed: May 28, 2002

(65) Prior Publication Data
US 2003/0225938 A1 Dec. 4, 2003

(51) Int. Cl.
*G06F 15/16* (2006.01)
*G06F 13/00* (2006.01)

(52) U.S. Cl. ............... 709/232; 709/217; 709/238; 711/148

(58) Field of Classification Search ........ 709/217–219, 709/230–245, 212–216; 370/389–393; 712/10–15; 711/150, 147–148
See application file for complete search history.

(56) References Cited

U.S. PATENT DOCUMENTS

| | | | | |
|---|---|---|---|---|
| 4,667,287 A | * | 5/1987 | Allen et al. | 709/234 |
| 4,783,657 A | | 11/1988 | Bouchard et al. | |
| 4,783,687 A | | 11/1988 | Rees | |
| 5,125,081 A | | 6/1992 | Chiba | |
| 5,166,674 A | * | 11/1992 | Baum et al. | 714/752 |
| 5,191,651 A | * | 3/1993 | Halim et al. | 709/250 |
| 5,197,130 A | * | 3/1993 | Chen et al. | 712/3 |
| 5,301,311 A | | 4/1994 | Fushimi et al. | 714/23 |
| 5,371,852 A | * | 12/1994 | Attanasio et al. | 709/245 |
| 5,394,555 A | | 2/1995 | Hunter et al. | |
| 5,561,768 A | | 10/1996 | Smith | 712/13 |
| 5,623,644 A | | 4/1997 | Self et al. | 713/503 |
| 5,682,512 A | * | 10/1997 | Tetrick | 711/202 |
| 5,692,123 A | | 11/1997 | Logghe | |
| 5,781,187 A | | 7/1998 | Gephardt et al. | |
| 5,796,605 A | * | 8/1998 | Hagersten | 700/5 |
| 5,805,839 A | * | 9/1998 | Singhal | 710/112 |
| 5,819,075 A | | 10/1998 | Forsmo | |

(Continued)

FOREIGN PATENT DOCUMENTS

EP 0978781 2/2000

(Continued)

OTHER PUBLICATIONS

International Search Report dated Jul. 30, 2004, from corresponding PCT Application No. PCT/US2003/034687 (9 pages).

(Continued)

*Primary Examiner*—Joseph E. Avellino
(74) *Attorney, Agent, or Firm*—Beyer Weaver LLP

(57) ABSTRACT

A multi-processor computer system is described in which address mapping, routing, and transaction identification mechanisms are provided which enable the interconnection of a plurality of multi-processor clusters, wherein the number of processors interconnected exceeds limited address, node identification, and transaction tag spaces associated with each of the individual clusters.

18 Claims, 9 Drawing Sheets

U.S. PATENT DOCUMENTS

| | | | |
|---|---|---|---|
| 5,822,531 A | 10/1998 | Gorczyca et al. | |
| 5,931,938 A * | 8/1999 | Drogichen et al. | 712/15 |
| 5,940,870 A * | 8/1999 | Chi et al. | 711/206 |
| 6,003,075 A | 12/1999 | Arendt et al. | |
| 6,018,791 A | 1/2000 | Arimilli et al. | |
| 6,038,651 A | 3/2000 | VanHuben et al. | |
| 6,047,332 A | 4/2000 | Viswanathan et al. | 709/245 |
| 6,065,053 A | 5/2000 | Nouri et al. | |
| 6,067,603 A | 5/2000 | Carpenter et al. | |
| 6,085,295 A * | 7/2000 | Ekanadham et al. | 711/145 |
| 6,097,707 A | 8/2000 | Hodzic et al. | 370/321 |
| 6,151,663 A | 11/2000 | Pawlowski et al. | |
| 6,167,492 A | 12/2000 | Keller et al. | 711/154 |
| 6,192,451 B1 | 2/2001 | Arimilli et al. | |
| 6,209,065 B1 * | 3/2001 | Van Doren et al. | 711/150 |
| 6,219,775 B1 | 4/2001 | Wade et al. | 712/11 |
| 6,226,671 B1 | 5/2001 | Hagersten et al. | 709/215 |
| 6,256,671 B1 * | 7/2001 | Strentzsch et al. | 709/227 |
| 6,259,701 B1 * | 7/2001 | Shur et al. | 370/401 |
| 6,330,643 B1 | 12/2001 | Arimilli et al. | |
| 6,331,983 B1 * | 12/2001 | Haggerty et al. | 370/400 |
| 6,334,172 B1 | 12/2001 | Arimilli et al. | |
| 6,338,122 B1 * | 1/2002 | Baumgartner et al. | 711/141 |
| 6,349,091 B1 | 2/2002 | Li | 370/238 |
| 6,370,585 B1 * | 4/2002 | Hagersten et al. | 709/238 |
| 6,377,640 B2 | 4/2002 | Trans | |
| 6,378,029 B1 * | 4/2002 | Venkitakrishnan et al. | 710/317 |
| 6,385,174 B1 | 5/2002 | Li | 370/252 |
| 6,385,705 B1 | 5/2002 | Keller et al. | 711/154 |
| 6,397,255 B1 * | 5/2002 | Nurenberg et al. | 709/228 |
| 6,405,289 B1 | 6/2002 | Arimilli et al. | |
| 6,463,529 B1 | 10/2002 | Miller et al. | |
| 6,467,007 B1 | 10/2002 | Armstrong et al. | |
| 6,490,661 B1 * | 12/2002 | Keller et al. | 711/150 |
| 6,542,926 B2 | 4/2003 | Zalewski et al. | |
| 6,553,439 B1 | 4/2003 | Greger et al. | |
| 6,578,071 B2 | 6/2003 | Hagersten et al. | 709/215 |
| 6,598,130 B2 * | 7/2003 | Harris et al. | 711/147 |
| 6,601,165 B2 | 7/2003 | Morrison et al. | |
| 6,615,319 B2 | 9/2003 | Khare et al. | |
| 6,631,447 B1 | 10/2003 | Morioka et al. | |
| 6,633,960 B1 | 10/2003 | Kessler et al. | |
| 6,675,253 B1 | 1/2004 | Brinkmann et al. | |
| 6,687,751 B1 | 2/2004 | Wils et al. | 709/230 |
| 6,690,757 B1 | 2/2004 | Bunton et al. | |
| 6,704,842 B1 | 3/2004 | Janakiraman et al. | |
| 6,718,552 B1 | 4/2004 | Goode | 725/95 |
| 6,751,698 B1 | 6/2004 | Deneroff et al. | |
| 6,754,782 B2 * | 6/2004 | Arimilli et al. | 711/144 |
| 6,760,819 B2 * | 7/2004 | Dhong et al. | 711/146 |
| 6,772,226 B1 | 8/2004 | Bommareddy et al. | 709/245 |
| 6,785,726 B1 * | 8/2004 | Freeman et al. | 709/227 |
| 6,820,174 B2 | 11/2004 | Vanderwiel | |
| 6,826,660 B2 | 11/2004 | Hagersten et al. | 711/153 |
| 6,842,857 B2 | 1/2005 | Lee et al. | |
| 6,847,993 B1 | 1/2005 | Novaes et al. | 709/221 |
| 6,854,069 B2 | 2/2005 | Kampe et al. | |
| 6,856,621 B1 * | 2/2005 | Artes | 370/390 |
| 6,865,595 B2 | 3/2005 | Glasco et al. | |
| 6,920,519 B1 | 7/2005 | Beukema et al. | 710/306 |
| 6,977,908 B2 | 12/2005 | De Azevedo et al. | |
| 7,010,617 B2 | 3/2006 | Kampe et al. | |
| 7,043,569 B1 | 5/2006 | Chou et al. | |
| 7,103,636 B2 | 9/2006 | Glasco et al. | |
| 7,103,823 B2 | 9/2006 | Nemawarkar et al. | |
| 7,117,419 B2 * | 10/2006 | Nemawarkar et al. | 714/758 |
| 7,155,525 B2 | 12/2006 | Glasco et al. | |
| 7,222,262 B2 | 5/2007 | Prasadh et al. | |
| 2001/0014097 A1 * | 8/2001 | Beck et al. | 370/401 |
| 2001/0037435 A1 | 11/2001 | Van Doren | |
| 2002/0004886 A1 * | 1/2002 | Hagersten et al. | 711/141 |
| 2002/0004915 A1 | 1/2002 | Fung | 713/320 |
| 2002/0007463 A1 | 1/2002 | Fung et al. | |
| 2002/0052914 A1 | 5/2002 | Zalewski et al. | |
| 2002/0083149 A1 | 6/2002 | Van Huben et al. | |
| 2002/0083243 A1 | 6/2002 | Van Huben et al. | |
| 2002/0087811 A1 | 7/2002 | Khare et al. | |
| 2002/0156888 A1 * | 10/2002 | Lee et al. | 709/224 |
| 2002/0157035 A1 | 10/2002 | Wong et al. | |
| 2002/0174168 A1 | 11/2002 | Beukema et al. | |
| 2003/0149844 A1 * | 8/2003 | Duncan et al. | 711/141 |
| 2003/0196047 A1 | 10/2003 | Kessler et al. | |
| 2003/0212873 A1 | 11/2003 | Lee et al. | |
| 2003/0225909 A1 | 12/2003 | Glasco et al. | 709/245 |
| 2003/0233388 A1 | 12/2003 | Glasco et al. | 718/101 |
| 2004/0073755 A1 | 4/2004 | Webb et al. | |
| 2004/0098475 A1 | 5/2004 | Zeitler et al. | 709/223 |

FOREIGN PATENT DOCUMENTS

| | | |
|---|---|---|
| WO | WO 02/39242 | 5/2002 |

OTHER PUBLICATIONS

*HyperTransport™ I/O Link Specification Revision 1.03*, HyperTransport™ Consortium, Oct. 10, 2001, Copyright© 2001 HyperTransport Technology Consortium.

D. E. Culler, J. P. Singh, A. Gupta, "Parallel Computer Architecture", 1999 Morgan Kaufmann, San Francisco, CA USA XP002277658.

Andrew Tanenbaum, "Computer Networks", Computer Networks, London: Prentice Hall International, GB, 1996, pp. 345-403, XP002155220.

Bossen et al., "Fault-tolerant design of the IBM pSeries 690 system POWER4 processor technology.", IBM J. Res. and Dev. vol. 46, No. 1, Jan. 2002.

Notice of Allowance mailed Nov. 30, 2004, from U.S. Appl. No. 10/157,340.

U.S. Office Action mailed Nov. 30, 2004, from U.S. Appl. No. 10/157,388.

Notice of Allowance mailed May 11, 2005, from U.S. Appl. No. 10/157,388.

Notice of Allowance mailed Aug. 27, 2005, from U.S. Appl. No. 10/157,388.

U.S. Office Action mailed Sep. 21, 2005, from U.S. Appl. No. 10/157,384.

U.S. Office Action mailed Jan. 30, 2006, from U.S. Appl. No. 10/157,384.

Notice of Allowance mailed Jun. 15, 2006, from U.S. Appl. No. 10/157,384.

Supplemental Notice of Allowance mailed Sep. 25, 2006, from U.S. Appl. No. 10/157,384.

U.S. Office Action mailed Sep. 21, 2005, from U.S. Appl. No. 10/157,409.

U.S. Office Action mailed Feb. 7, 2006, from U.S. Appl. No. 10/157,409.

U.S. Office Action mailed Jul. 6, 2006, from U.S. Appl. No. 10/157,409.

U.S. Office Action mailed Dec. 4, 2006, from U.S. Appl. No. 10/300,408.

U.S. Office Action mailed May 18, 2007, from U.S. Appl. No. 10/300,408.

U.S. Office Action mailed Apr. 18, 2006, from U.S. Application No. 10/356,393.

U.S. Office Action mailed Oct. 4, 2006, from U.S. Appl. No. 10/356,393.

U.S. Office Action mailed May 21, 2007, from U.S. Appl. No. 10/356,393.

U.S. Office Action mailed Aug. 14, 2006, from U.S. Appl. No. 10/635,700.

Notice of Allowance mailed Jan. 24, 2007, from U.S. Appl. No. 10/635,700.

U.S. Office Action mailed Dec. 12, 2005, from U.S. Appl. No. 10/635,884.

Notice of Allowance mailed Apr. 19, 2006, from U.S. Appl. No. 10/635,884.

U.S. Office Action mailed Feb. 2, 2006 from U.S. Appl. No. 10/635,705.

Notice of Allowance mailed Aug. 18, 2006, from U.S. Appl. No. 10/635,705.

U.S. Office Action mailed Nov. 15, 2005 from U.S. Appl. No. 10/635,793.

Notice of Allowance mailed May 23, 2006, from U.S. Appl. No. 10/635,793.

European Search report mailed Sep. 6, 2005, from European Application No. 03778027.7.

European Search report mailed Mar. 29, 2006, from European Application No. 03778027.7.

European Search report mailed Dec. 19, 2006, from European Application No. 03778027.7.

International Search Report dated Jan. 12, 2005, from PCT Application No. PCT/US2004/022935.

Written Opinion dated Jan. 12, 2005, from PCT Application No. PCT/US2004/022935.

Office Action mailed Apr. 18, 2006 in U.S. Appl. No. 10/356,393, filed Jan. 30, 2003.

European Search Report mailed Mar. 29, 2006 in Application No. 03 778 027.7-2211.

* cited by examiner

| | | Local Table | | Global Table | | | |
|---|---|---|---|---|---|---|---|
| | | Dest Node | | Dest Cluster | | | |
| Source | | $N_0$ | $N_1$ | $C_0$ | $C_1$ | $C_2$ | $C_3$ |
| Cluster 0 | Node 0 | X | $L_0$ | NA | NA | NA | NA |
| | Node 1 | $L_0$ | X | X | $L_1$ | $L_2$ | $L_1$ |
| Cluster 1 | Node 0 | X | $L_0$ | NA | NA | NA | NA |
| | Node 1 | $L_0$ | X | $L_1$ | X | $L_2$ | $L_2$ |
| Cluster 2 | Node 0 | X | $L_0$ | NA | NA | NA | NA |
| | Node 1 | $L_0$ | X | $L_2$ | $L_2$ | X | $L_1$ |
| Cluster 3 | Node 0 | X | $L_0$ | NA | NA | NA | NA |
| | Node 1 | $L_0$ | X | $L_2$ | $L_2$ | $L_1$ | X |

ROUTING MECHANISMS IN SYSTEMS HAVING MULTIPLE MULTI-PROCESSOR CLUSTERS

BACKGROUND OF THE INVENTION

The present invention relates generally to multi-processor computer systems. More specifically, the present invention provides techniques for building computer systems having a plurality of multi-processor clusters.

A relatively new approach to the design of multi-processor systems replaces broadcast communication among processors with a point-to-point data transfer mechanism in which the processors communicate similarly to network nodes in a tightly-coupled computing system. That is, the processors are interconnected via a plurality of communication links and requests are transferred among the processors over the links according to routing tables associated with each processor. The intent is to increase the amount of information transmitted within a multi-processor platform per unit time.

One limitation associated with such an architecture is that the node ID address space associated with the point-to-point infrastructure is fixed, therefore allowing only a limited number of nodes to be interconnected. In addition, the infrastructure is flat, therefore allowing a single level of mapping for address spaces and routing functions. It is therefore desirable to provide techniques by which computer systems employing such an infrastructure as a basic building block are not so limited.

SUMMARY OF THE INVENTION

According to the present invention, a multi-processor system is provided in which a plurality of multi-processor clusters, each employing a point-to-point communication infrastructure with a fixed node ID space and flat request mapping functions, are interconnected using additional point-to-point links in such a manner as to enable more processors to be interconnected than would otherwise be possible with the local point-to-point architecture. The invention employs a mapping hierarchy to uniquely map various types of information from local, cluster-specific spaces to globally shared spaces.

Thus, the present invention provides an interconnection controller for use in a computer system having a plurality of processor clusters interconnected by a plurality of global links. Each cluster includes a plurality of local nodes and an instance of the interconnection controller interconnected by a plurality of local links. The interconnection controller includes circuitry which is operable to map locally generated transmissions directed to others of the clusters to the global links, and remotely generated transmissions directed to the local nodes to the local links. According to a specific embodiment, a computer system employing such an interconnection controller is also provided.

A further understanding of the nature and advantages of the present invention may be realized by reference to the remaining portions of the specification and the drawings.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
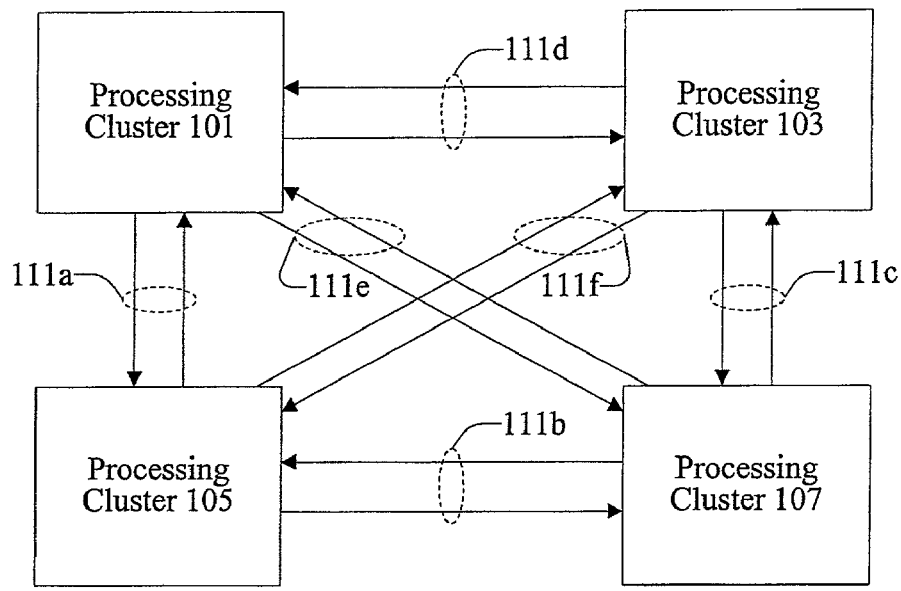
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 111a-f. The multiple processors in the multiple cluster architecture shown in FIG. 1A share a global memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
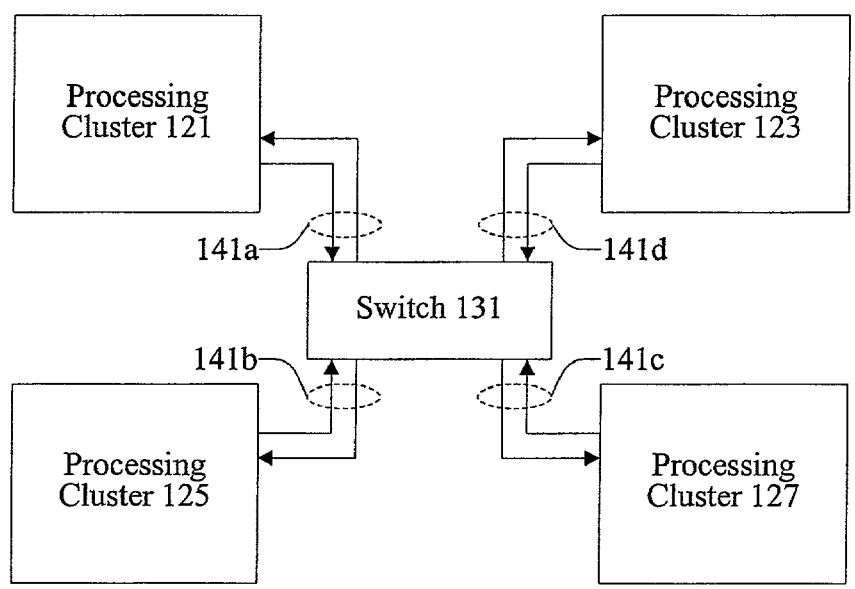

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a-d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
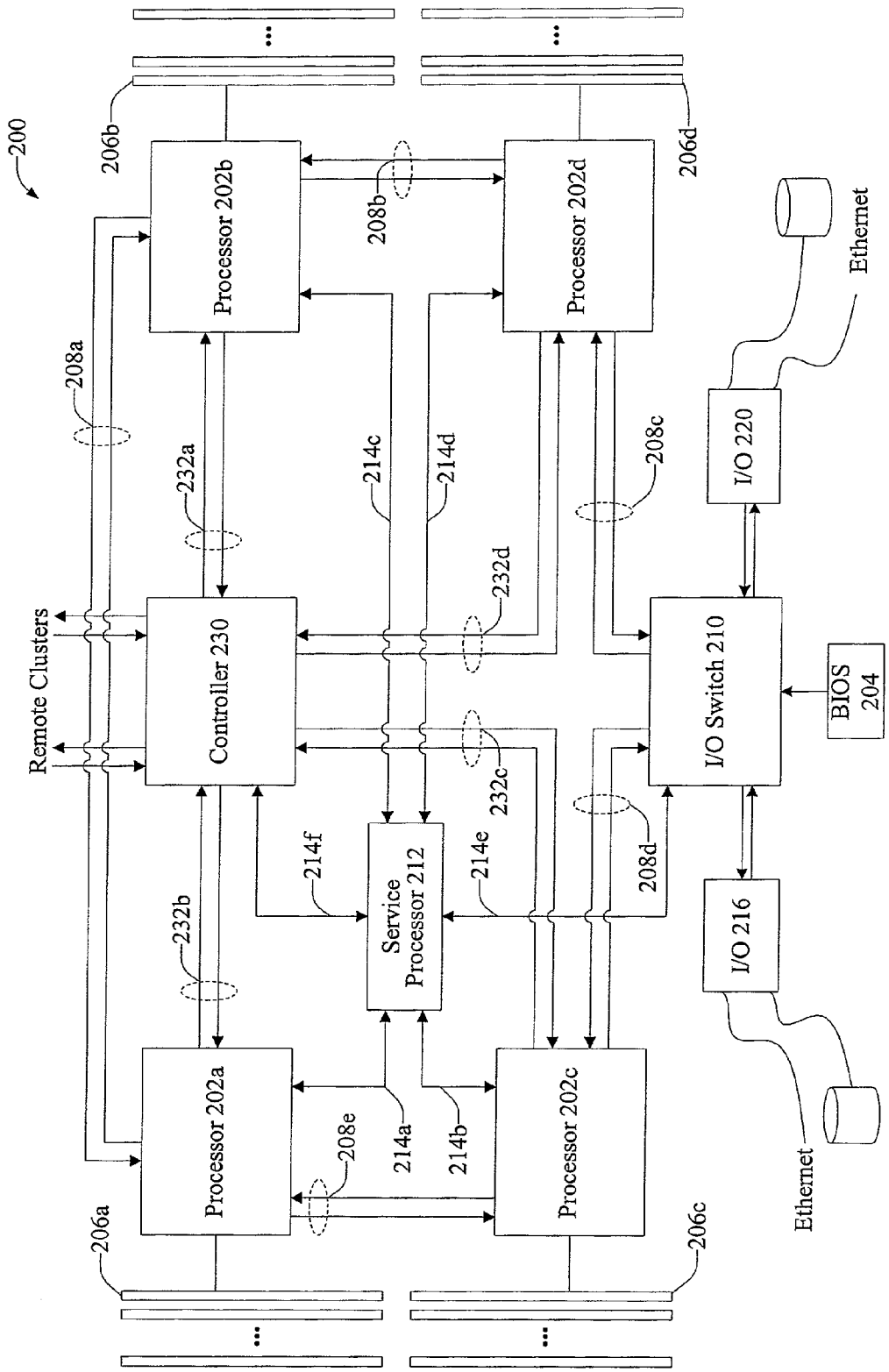
FIG. 2 is a diagrammatic representation of an exemplary cluster having a plurality of processors for use with specific embodiments of the present invention.

FIG. 2 is a diagrammatic representation of a multiple processor cluster such as, for example, cluster 101 shown in FIG. 1A. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and interconnection controller 230. The service processor 212 is configured to allow communications with processors 202a-202d, 1/0 switch 210, and interconnection controller 230 via a JTAG interface represented in FIG. 2 by links 214a-214f. It should be noted that other interfaces are supported. I/O switch 210 connects the rest of the system to I/O adapters 216 and 220, and to BIOS 204 for booting purposes.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a-d are also coupled to an interconnection controller 230 through point-to-point links 232a-d. According to various embodiments and as will be described below in greater detail, interconnection controller 230 performs a variety of functions which enable the number of interconnected processors in the system to exceed the node ID space and mapping table limitations associated with each of a plurality of processor clusters. According to some embodiments, interconnection controller 230 performs a variety of other functions including the maintaining of cache coherency across clusters. Interconnection controller 230 can be coupled to similar controllers associated with other multiprocessor clusters. It should be noted that there can be more than one such interconnection controller in one cluster. Interconnection controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet. BIOS 204 may be any persistent memory like flash memory.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, the interconnect controller 230 is an Application Specific Integrated Circuit (ASIC). In yet another embodiment, the interconnect controller 230 is a general purpose processor augmented with an ability to access and process interconnect packet traffic.

Figure 3:
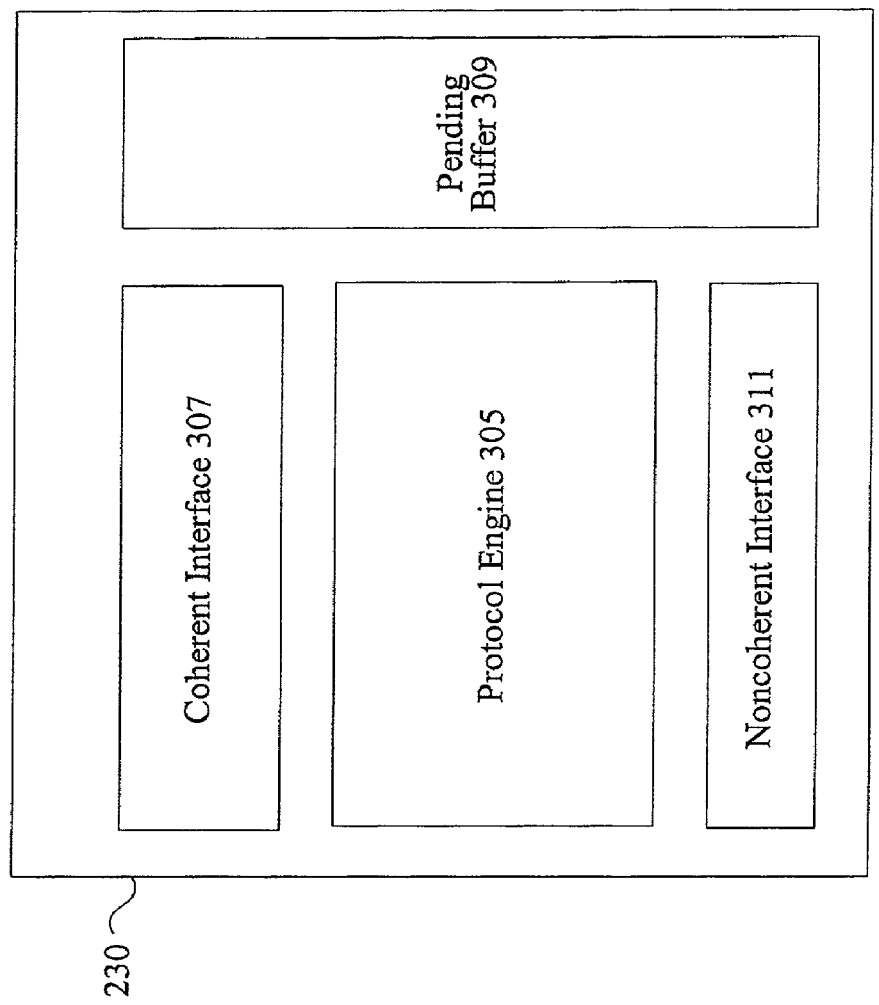
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information. As will become clear, this functionality is leveraged to enable particular aspects of the present invention.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices (e.g., as represented in FIG. 2 by links 208c and 208d). According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 4:
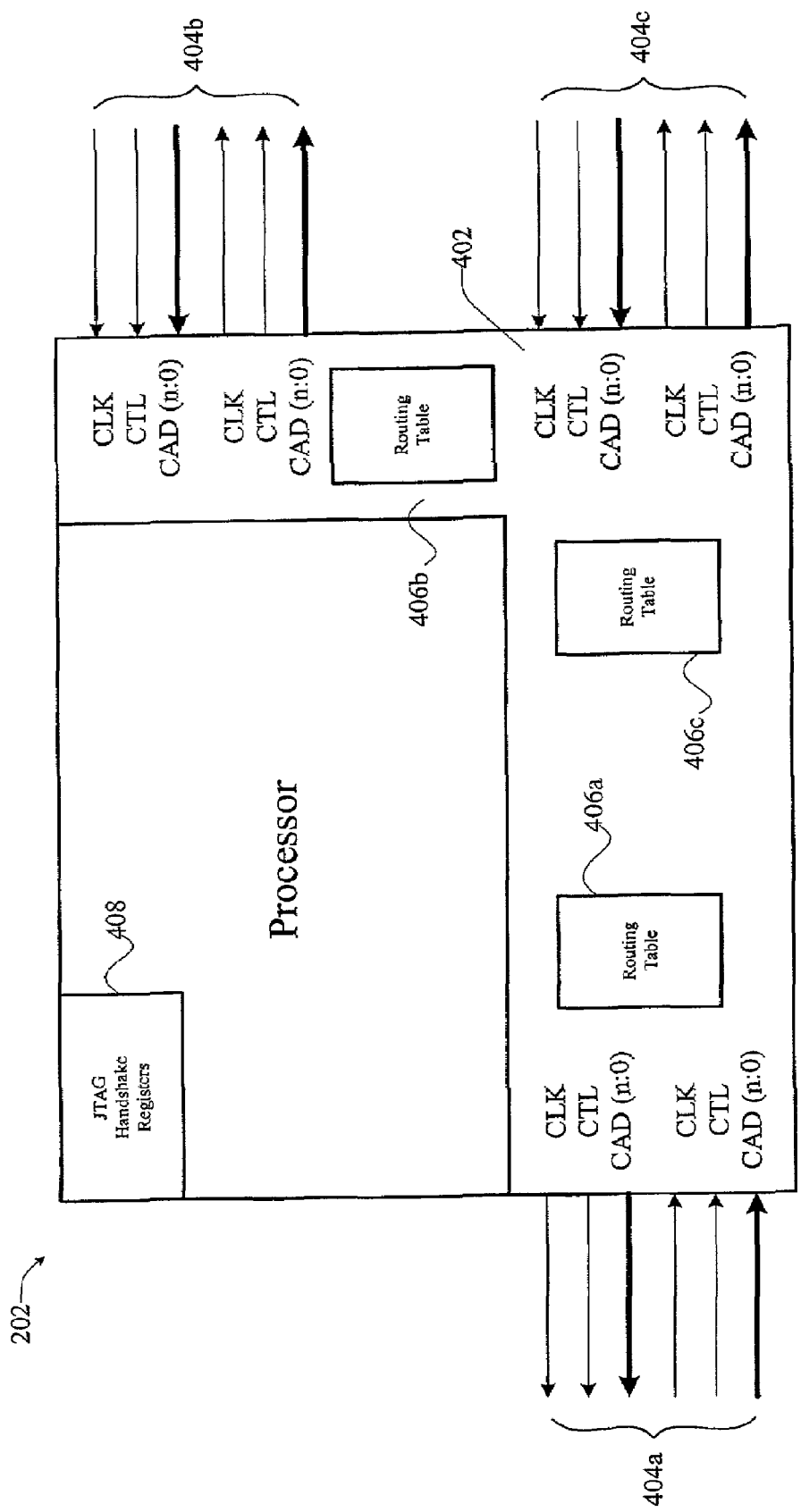
FIG. 4 is a diagrammatic representation of a local processor for use with various embodiments of the present invention.

According to various embodiments of the invention, processors 202a-202d are substantially identical. FIG. 4 is a simplified block diagram of such a processor 202 which includes an interface 402 having a plurality of ports 404a-404c and routing tables 406a-406c associated therewith. Each port 404 allows communication with other resources, e.g., processors or I/O devices, in the computer system via associated links, e.g., links 208a-208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor which has a unique node ID and a plurality of associated resources which it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a-406c comprise two-level tables, a first level associating the unique addresses of system resources (e.g., a memory bank) with a corresponding node (e.g., one of the processors), and a second level associating each node with the link (e.g., 208a-208e) to be used to reach the node from the current node.

Processor 202 also has a set of JTAG handshake registers 408 which, among other things, facilitate communication between the service processor (e.g., service processor 212 of FIG. 2) and processor 202. That is, the service processor can write routing table entries to handshake registers 408 for eventual storage in routing tables 406a-406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if this basic protocol is employed without the innovations represented by the present invention, only 8 nodes may be interconnected in a single cluster via the point-to-point infrastructure. To get around this limitation, the present invention introduces a hierarchical mechanism which preserves the single-layer identification scheme within particular clusters while enabling interconnection with and communication between other similarly situated clusters and processing nodes.

According to a specific embodiment, one of the nodes in each multi-processor cluster is an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

According to a specific embodiment and as mentioned above, the interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

According to an even more specific embodiment which will be described with reference to FIG. 5, each cluster has five nodes (e.g., as shown in FIG. 2) which include four processors 202a-d and an interconnection controller 230, each of which is represented by a 3-bit node ID which is unique within the cluster. As mentioned above, each processor (i.e., cluster node) may represent a number of sub-units including, for example, CPUs, memory controllers, etc.

Figure 5:
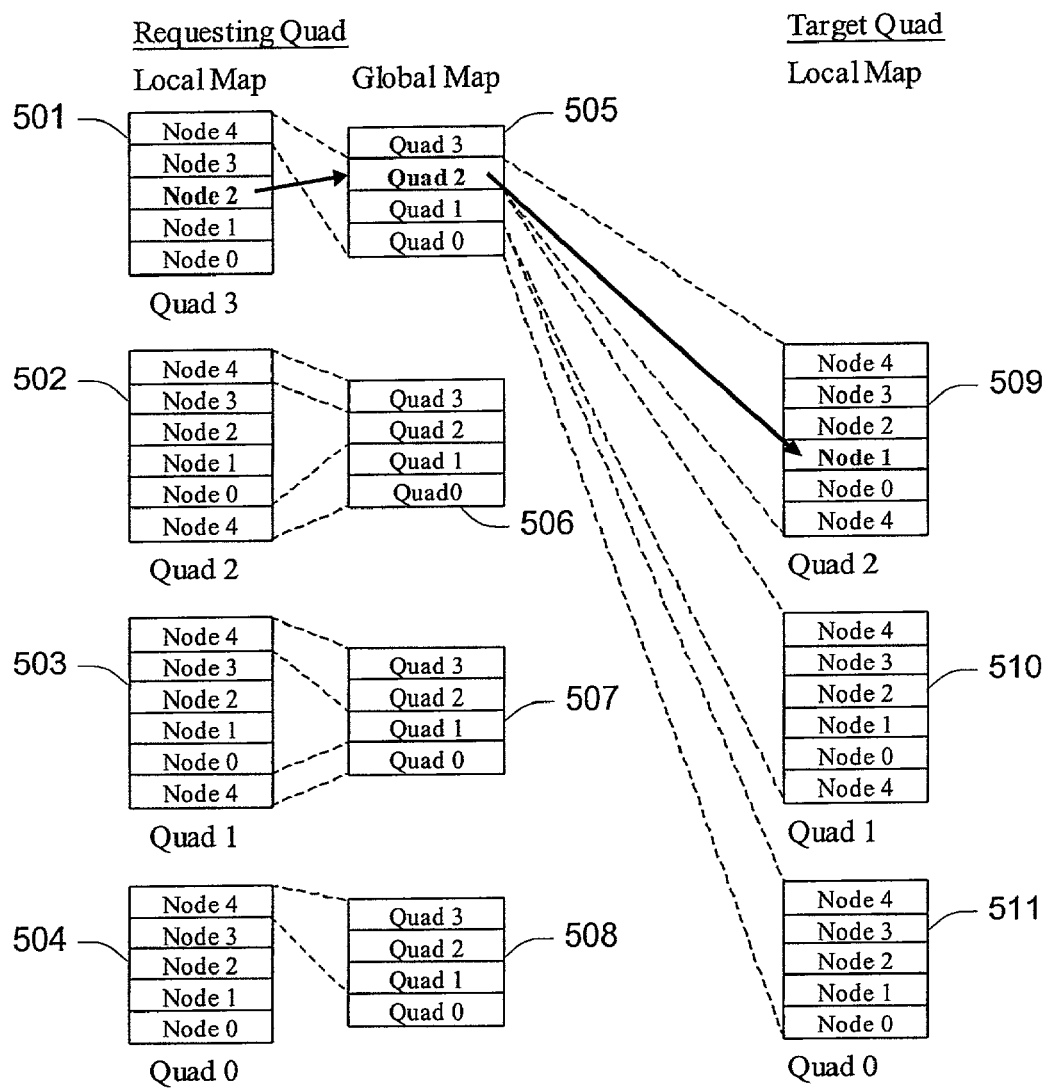
FIG. 5 is a diagrammatic representation of a memory mapping scheme according to a particular embodiment of the invention.

An illustration of an exemplary address mapping scheme designed according to the invention and assuming such a cluster configuration is shown in FIG. 5. In the illustrated example, it is also assumed that the global memory space is shared by 4 such clusters also referred to herein as quads (in that each contains four local processors). As will be understood, the number of clusters and nodes within each cluster may vary according to different embodiments.

To extend the address mapping function beyond a single cluster, each cluster maps its local memory space, i.e., the portion of the global memory space associated with the processors in that cluster, into a contiguous region while the remaining portion of the global memory space above and below this region is mapped to the local interconnection controller(s). The interconnection controller in each cluster maintains two mapping tables: a global map and local map. The global map maps outgoing requests to remote clusters. The local map maps incoming requests from remote clusters to a particular node within the local cluster.

Referring now to FIG. 5, each local cluster has a local memory map (501-504), which maps the local memory space (i.e., the contiguous portion of the global memory space associated with the local processors) into the respective nodes and maps all remote memory spaces (i.e., the remainder of the global memory space) into one or two map entries associated with the local interconnection controller (s), e.g., Node 4 of Quad 3. Each node in the local cluster has a copy of the local map. The interconnection controller in each cluster also maintains a global map (505-508) relating these remote memory spaces with each of the other clusters in the system. Each interconnection controller uses its copy of the local map (509-511) to map requests received from remote clusters to the individual nodes in its cluster.

An exemplary transaction described with reference to FIG. 5 may be illustrative. In this example, Node 2 in Quad 3 generates a request that maps (via map 501) to the local interconnection controller (i.e., Node 4). When the interconnection controller receives this request, its global map 505 maps the address to Quad 2. The interconnection controller then forwards the request to Quad 2. The interconnection controller at Quad 2 uses its local memory map to determine the proper node to target for the request—Node 1 in this example.

In a particular implementation, each processor or cluster node is limited to eight memory map registers. The scheme described above with reference to FIG. 5 requires four entries for the local memory space and at most two registers for remote space. Therefore, according to more specific embodiments, the two remaining entries can be used to subdivide regions. The eight mapping register limit requires that all memory local to a quad be allocated within a contiguous block. The interconnection controller's local memory map in such embodiments is also eight entries. However, the size of the interconnection controller's global map size is determined by the number of clusters in the system. According to various embodiments, the memory mapped I/O space is mapped by an identical set of mapping registers.

As described above, on the local cluster level, information from address mapping tables is used to identify the appropriate link on which to transmit information to a destination node within the cluster. To effect transmissions between clusters using the global mapping described above, a similar mechanism is needed. Therefore, according to various embodiments, in addition to the local routing tables associated with each node in a cluster, the interconnection controller maintains global routing information which maps the other clusters in the system to the various point-to-point transmission links interconnecting the clusters (e.g., links 111 of FIG. 1A).

According to a specific embodiment of the invention, two types of local routing tables are employed: one for directed packets and one for broadcast packets. Each table (e.g., tables 406 of FIG. 4) maintains a mapping between target nodes and links. For directed packets, a separate table is used for request and for responses. This allows responses to be routed back to the requester along the same path as the request. Maintaining the same route simplifies debugging and is not required for correctness. For broadcast packets, the corresponding table indicates on which links the broadcast packet is forwarded. A broadcast packet may thus be routed to multiple links.

In a particular implementation of the interconnection controller of the present invention, its local tables map a local destination node to one of four links for directed packets and any number of links for broadcast packets. The interconnection controller also maintains a global routing table which maps remote destination clusters to a particular remote link. According to a particular embodiment, the interconnection controller also supports multicast of packets at the global routing level.

Figures 6A, 6B:
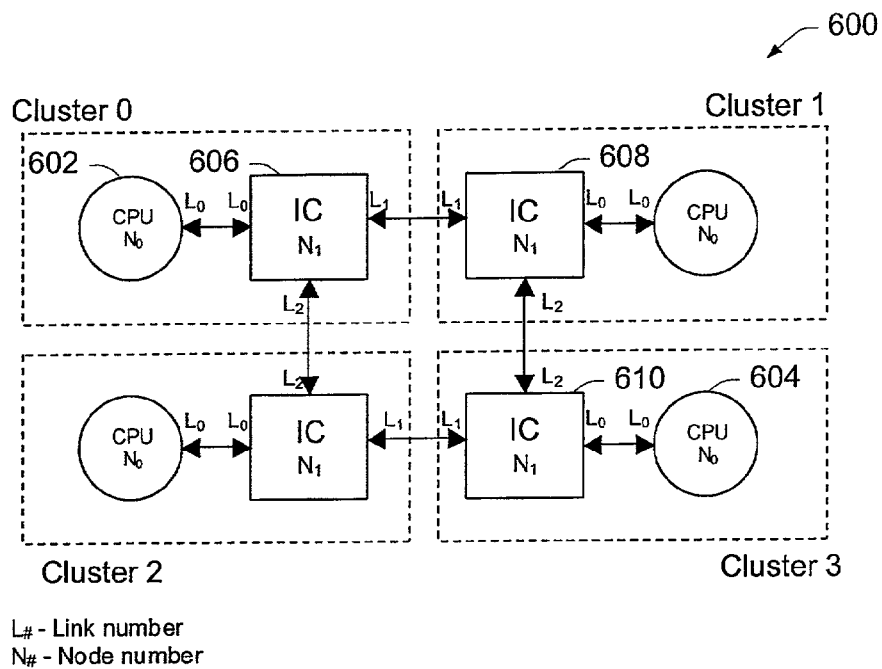
FIG. 6A is a simplified block diagram of a four cluster system for illustrating a specific embodiment of the invention.
FIG. 6B is a combined routing table including routing information for the four cluster system of FIG. 6A.

A specific embodiment of a routing mechanism designed according to the present invention will now be described with reference to FIGS. 6A and 6B. System 600 of FIG. 6A includes four clusters each having a plurality of local nodes including nodes $N_0$ and $N_1$. The table of FIG. 6B combines all of the local and global routing tables of the system for illustrative purposes.

As part of an exemplary transaction, a CPU 602 at node No in Cluster 0 generates a packet directed to a CPU 604 at node $N_0$ in the Cluster 3. This packet could be, for example, a memory request that maps to a memory controller at that node. Because CPU 602 has no knowledge of anything outside of its cluster, it generates the packet targeting node $N_1$, in Cluster 0 (i.e., the local interconnection controller 606) as the destination. As discussed above, this is due to the fact that the local memory map owned by node $N_0$ (see the relevant portion of the table of FIG. 6B) identifies node $N_1$, as corresponding to all memory owned by remote clusters. Interconnection controller 606 receives the packet, uses its global address map (e.g., as described above) to determine that the final destination of the packet is Cluster 3, and generates a remote packet targeting Cluster 3. Then, using its global routing table (i.e., relevant portion of FIG. 6B), interconnection controller 606 determines that this packet must be sent out on link $L_1$. Similar to the local routing mechanism described above, information identifying the source and destination cluster is appended to the packet.

When interconnection controller 608 at Cluster 1 receives the packet, it also determines that the packet is destined for Cluster 3 and determines from its global routing table (FIG. 6B) that link $L_2$ must be used to send the packet. Interconnection controller 610 at Cluster 3 receives the packet, determines that the packet is targeting the local cluster, and uses its local routing table (FIG. 6B) to determine that local link $L_0$ must be used to send the packet to its destination. CPU 604 at node No then receives the packet via link $L_0$. According to specific embodiments in which the node ID space is a 3-bit ID space, this multi-level routing mechanism can be extended to eight local nodes with no specific limit on the number of clusters.

Embodiments of the invention also address the issue of transaction identification in a system having a plurality of multi-processor clusters. In general, the importance of the unique identification of transactions in a multi-processor environment is understood. And where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, embodiments of the present invention provide mechanisms which extend the local tag spaces such that each transaction in the multi-cluster system is uniquely identified.

More specifically, these embodiments map transactions from the local transaction tag space to a larger global transaction tag space. As described above, the local tag space is specified using the node ID, the unit ID, and a transaction ID. On top of that, the global tag space is specified using a global cluster ID and a global transaction ID. According to one embodiment, the interconnection controllers in the system use their pending buffers to simplify the allocation and management of the mapping and remapping actions. According to an even more specific embodiment and as will be described, additional protocol management is used to maintain the uniqueness of the global transaction tags.

According to a specific embodiment, all transactions within a cluster are tagged with a unique ID generated by the requesting node. The processors in each cluster which are not the interconnection controller support a 3-bit node ID, a 2-bit unit ID and a 5-bit transaction ID. The combination of these fields creates a 10 bit tag which is unique within the cluster. The unit ID represents sub-units within a node. It should be noted that a particular node may or may not include a processor as one of its sub-units, e.g., the node might contain only memory.

According to one embodiment, to extend to the transaction tag space beyond the local cluster, each cluster's interconnection controller maps each its cluster's local tag space into the global tag space using a Q-bit Cluster ID and a T-bit Transaction ID. In the exemplary system in which each cluster has a 5-bit transaction ID and there are four clusters, T might be 7 and Q might be 2.

Figure 7:
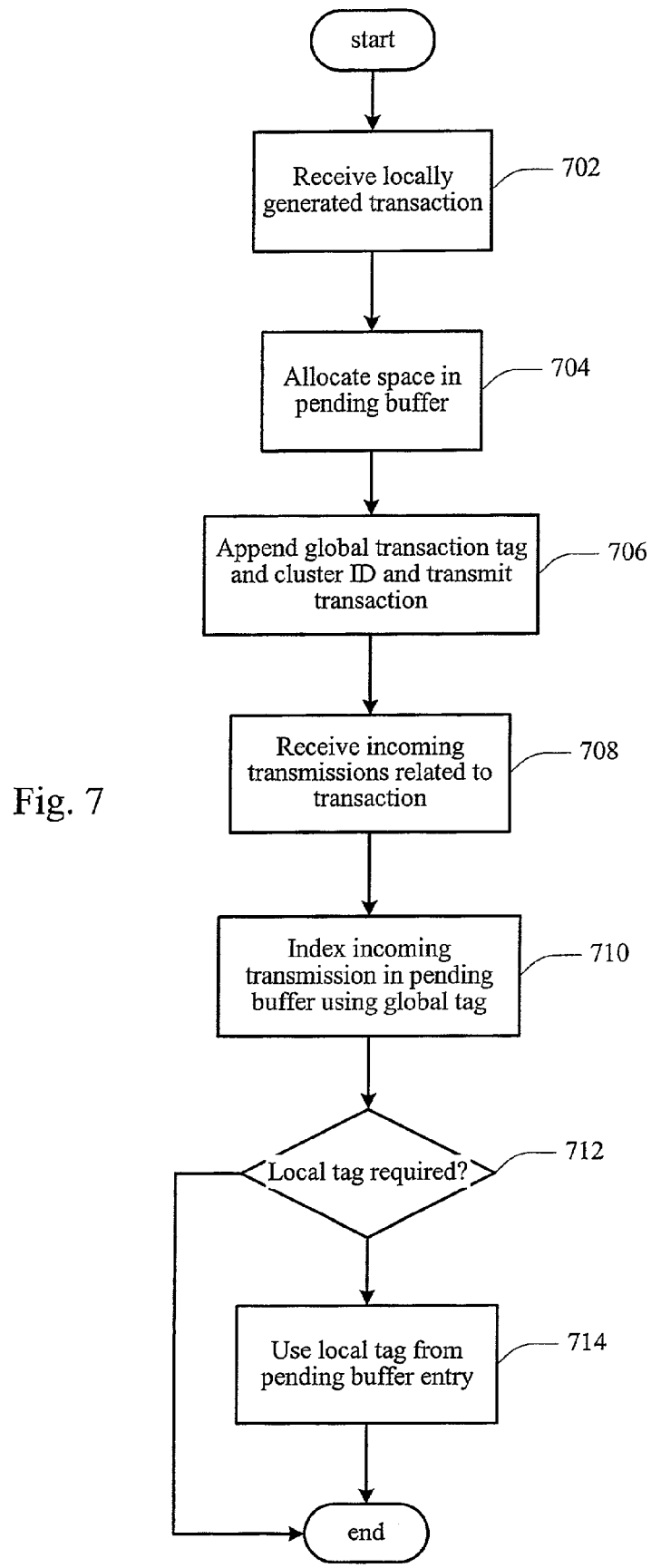
FIGS. 7 and 8 are flowcharts illustrating transaction management in a multi-cluster system according to specific embodiments of the invention.

According to one embodiment illustrated in FIG. 7, the local to global mapping process is accomplished as follows. New outgoing transactions, i.e., locally generated transactions involving remote clusters, are received by the cluster's interconnection controller (702) and are allocated an entry in the protocol engine's global pending buffer (704), e.g., pending buffer 309 of FIG. 3. The buffer entry identifier is unique for each such transaction, and therefore, according to various embodiments, is used as a unique global transaction tag. According to a specific embodiment, the number of entries in the pending buffer cannot exceed the size of the global transaction tag space for this mechanism. Also included in the pending buffer entry is the local transaction tag. Thus, the information mapping the transaction from the local tag space to the global tag space is implicitly contained in the pending buffer. The outgoing transaction is then tagged with the global transaction tag, along with a cluster ID that is specified during initial system configuration (706). When incoming transmissions associated with the transaction are received (708), the global transaction tag is used to index into the global pending buffer (710). If a local transaction tag is required (712), the local tag from the indexed pending buffer entry is used to tag the transaction (714).

Figure 8:
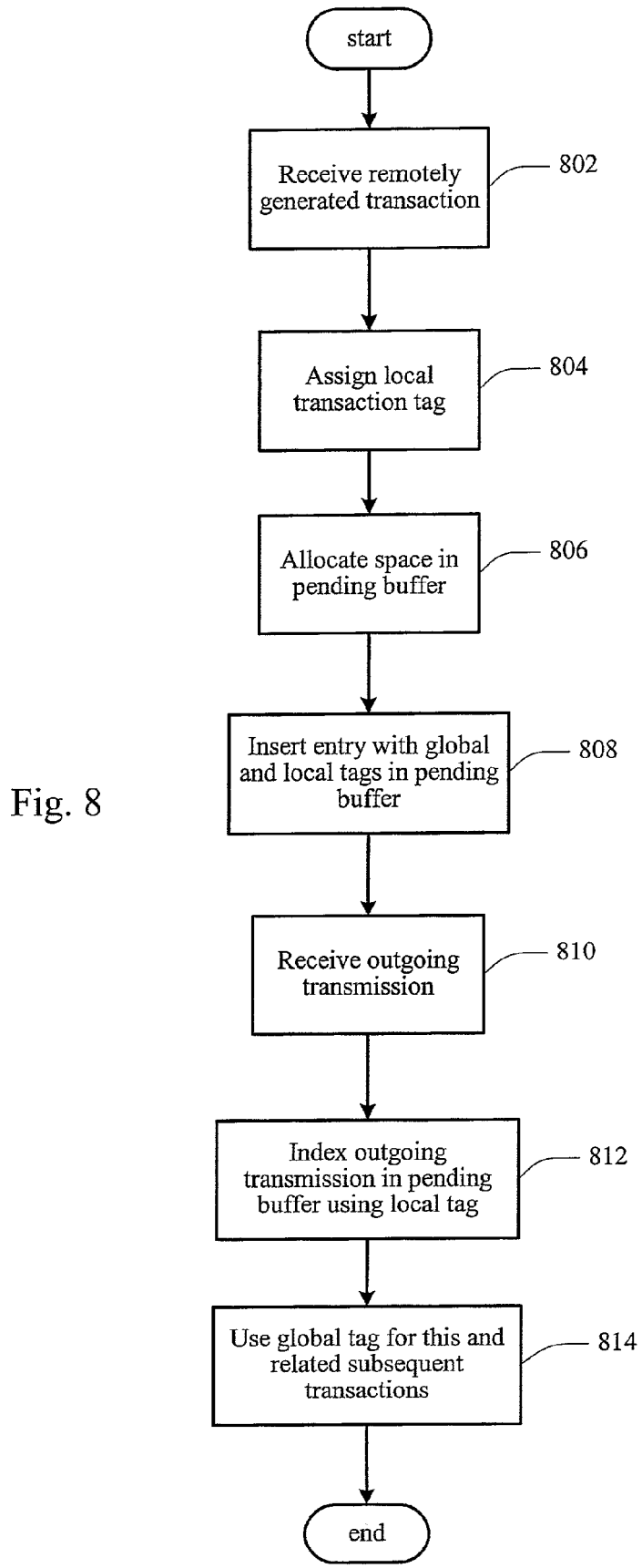

According to a specific embodiment illustrated in FIG. 8, the global to local mapping process is as follows. New incoming transactions, i.e., remotely generated transactions involving the local cluster, are received by the local cluster's interconnection controller (802) and assigned a local transaction tag using a similar mechanism as described above (804). In this case, a pending buffer entry is allocated in the protocol engine's local pending buffer (806), and an entry containing the global tag is inserted into the newly allocated pending buffer entry (808). When outgoing transmissions associated with the transaction are received (810), the local transaction tag is used to index into the local pending buffer to obtain the proper global tag (812) which is used if subsequent outgoing transmissions are required (814).

Figure 9:
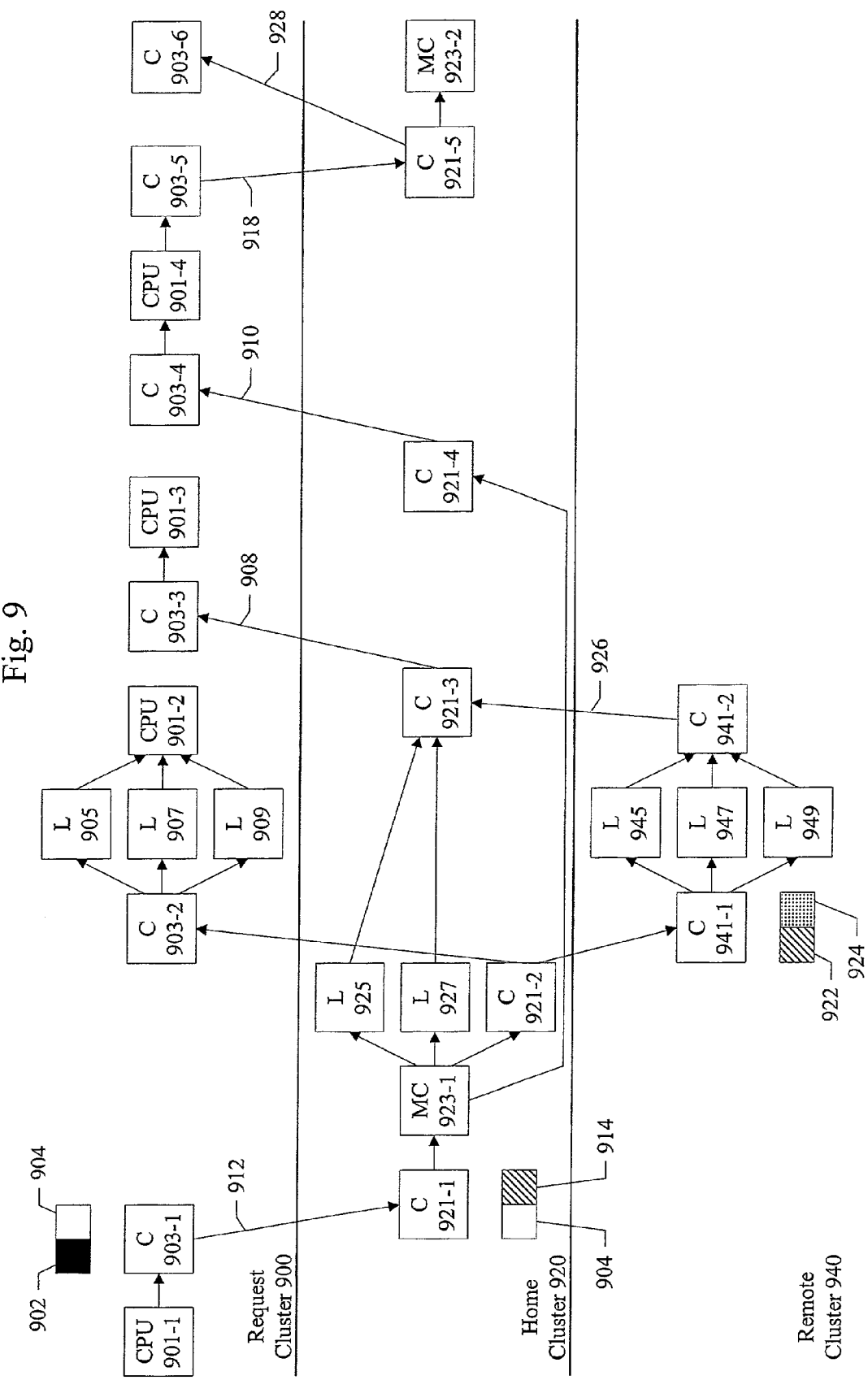
FIG. 9 is a diagrammatic representation of communications relating to an exemplary transaction in a multi-cluster system.

An example of the tag mapping mechanisms of a specific embodiment of the invention will now be described with reference to FIG. 9. FIG. 9 is a diagrammatic representation depicting the transactions for a data request from a local processor sent to a non-local cluster using an interconnection controller. It will be understood that the transactions depicted are merely exemplary and should not be used to limit the scope of the invention. The multi-cluster system includes a request cluster 900, a home cluster 920, and a remote cluster 940. The home cluster 920 and the remote cluster 940 are referred to herein as non-local clusters. Processors and interconnection controllers associated with local and non-local clusters are similarly referred to herein as local processors, local interconnection controllers, non-local processors, and non-local interconnection controllers, respectively.

According to various embodiments, processor 901-1 in a local cluster 900 sends a data access request such as a read request to an interconnection controller 903-1. The requesting node 901-1 generates the request with a local tag (e.g., tag 902) in the cluster's local tag space. The interconnection controller 903-1 maps the outgoing request into the global tag space (e.g., using global tag 904) and the mapping is saved in the pending buffer (e.g., buffer 309 of FIG. 3) of interconnection controller 903-1 as described above (e.g., table insertion: local tag 902/global tag 904). Interconnection controller 903-1 then forwards the request to an interconnection controller 921-1 in a home cluster 920. Incoming responses associated with the transaction (e.g., 908 and 910) are mapped from the global tag space back to the local tag space using a table lookup in the interconnection controller 903's pending buffer.

At home cluster 920, incoming requests (e.g., 912) are mapped by interconnection controller 921-1 into the local tag space (e.g., using tag 914) and the mapping is saved in the pending buffer of controller 921-1 (e.g., table insertion: global tag 904/local tag 914). Outgoing responses from home cluster 920 (e.g., 908 and 910) are mapped from the local tag space back to the global tag space using a table lookup in interconnection controller 921's pending buffer. Incoming responses to the home cluster are mapped from the global tag space back to the local tag space using a table lookup in interconnection controller 921's pending buffer.

In this exemplary transaction, interconnection controller 921-1 forwards the access request to a memory controller 923-1 also associated with home cluster 920. At this point, memory controller 923-1 locks the memory line associated with the request. In one example, the memory line is a unique address in the memory space shared by the multiple processors in request cluster 900, home cluster 920, and remote cluster 940. Memory controller 923-1 generates a probe associated with the data access request and forwards the probe to local nodes associated with cache blocks 925 and 927 as well as to interconnection controller 921-2.

Interconnection controller 941-1 at remote cluster 940 maps global tags (e.g., tag 922) into its local tag space using local tags (e.g., tag 924). Responses (e.g., 926) are mapped from the local tag space back to the global tag space using a table lookup in interconnection controller 941's pending buffer. In response to the probe from home cluster 920, interconnection controller 941-1 probes local nodes associated with cache blocks 945, 947, and 949. Similarly, interconnection controller 903-2 associated with request cluster 900 receives a probe and forwards the probe to local nodes associated with cache blocks 905, 907, and 909. Processor 901-2 receives probe responses from the local nodes associated with cache blocks 905, 907, and 909.

According to various embodiments, interconnection controller 921-3 accumulates probe responses and sends the probe responses to interconnection controller 903-3, which in turn forwards the probe responses to the processor 901-3. Interconnection controller 921-4 also sends a read response to interconnection controller 903-4, which forwards the read response to processor 901-4. After receiving the fetched data, processor 901-4 sends a source done response to interconnection controller 903-5. Interconnection controller 903-5 forwards the source done message to interconnection controller 921-5. Interconnection controller 921-5 in turn sends a source done message to memory controller 923-2.

According to a specific embodiment, interconnection controller 921-5 also acknowledges the Source Done transaction (918) with a tag release transaction (928) to controller 903-6 at the requesting cluster that allows it to reuse the tag. As described below, this acknowledgment prevents the requesting cluster from reusing a global tag until the global tag is no longer in use in the system.

It should be noted that the above-described tag mapping mechanism works for all transaction types with the exception of the Source Done transaction. In this case, the outgoing SD transaction received by the interconnection controller at the requesting cluster is tagged with the local node's identifier. As a result, the interconnection controller at the requesting cluster must search its pending buffer for an entry with a matching local tag and then use the index as the global tag. The same mechanism is required when the SD transaction reaches the home cluster. In this case, the pending buffer at the home quad is searched for a matching global tag and the index is used as the local tag.

According to a specific embodiment, the final tag release transaction (e.g., 928) is provided to inform the requesting cluster when a given tag may be reused. This tag release mechanism is for preventing ambiguity of Source Done (SD) transactions at the home cluster. For example, without such a mechanism, after the requesting cluster completes a transaction and a SD transaction is sent to the home cluster (e.g., 918), a new transaction can be generated at the requesting cluster with the same global tag. A transmission associated with this transaction could potentially be received at the home cluster and inserted into the home cluster pending buffer prior to the receipt of the first SD transaction as they travel on different virtual channels. Under such circumstances, the pending buffer at the home cluster would have multiple entries with the same global tag. Requiring the tag release transaction forecloses this possibility.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to a particular multi-processor architecture having a limited node ID space and flat request mapping functions. It will be understood, however, that the present invention applies more generally to a wide variety of multi-processor architecture which employ a point-to-point communication infrastructure to facilitate communication among the various nodes in the system. In addition, each of the various aspects of the embodiments described herein relating to, for example, address mapping, routing mechanisms, and transaction identification, may be used in combination with various alternatives of other ones of these aspects without departing from the scope of the invention.

It should also be understood that the various embodiments of the invention may be implemented or represented in a wide variety of ways without departing from the scope of the invention. That is, for example, the interconnection controller described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS), and device types (e.g., ASICs) suitable for designing and manufacturing the processes and circuits described herein are within the scope of the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system comprising a plurality of processor clusters interconnected by a plurality of global point-to-point links and having a global memory address space associated therewith, each cluster including a plurality of local nodes and an interconnection controller interconnected by a plurality of local point-to-point links, each cluster having a local memory address space associated therewith corresponding to a first portion of the global memory address space, wherein the interconnection controller in each cluster is mapped by the associated local nodes to a remainder portion of the global memory address space exclusive of the first portion, each cluster having routing information associated with each of the local nodes for facilitating communication between the local nodes and the interconnection controller via specific ones of the local links identified in the associated routing information, wherein the interconnection controller in each cluster is operable to maintain at least one local routing table relating each of the local nodes to at least one of the local links, at least one global routing table relating each of the other clusters to at least one of the global links, and memory mapping information relating each of the other clusters to respective portions of the remainder portion of the global memory address space, and wherein the interconnection controller in each cluster is operable to map locally generated transmissions directed to the remainder portion of the global memory address space to the global links using the memory mapping information and the at least one global routing table, and remotely generated transmissions directed to the local nodes to the local links using the at least one local routing table.

2. The computer system of claim 1 wherein the at least one local routing table comprises a directed routing table for facilitating directed transmissions between specified nodes on the local links, and a broadcast routing table for facilitating broadcast transmission to more than one node on the local links.

3. The computer system of claim 1 wherein the at least one global routing table comprises a directed routing table for facilitating directed transmissions between specified nodes on the global links, and a broadcast routing table for facilitating broadcast transmission to more than one node on the global links.

4. The computer system of claim 1 wherein the local links comprise point-to-point links.

5. The computer system of claim 4 wherein the plurality of clusters comprises four clusters.

6. The computer system of claim 5 wherein the plurality of local nodes in each cluster comprises four local processors.

7. The computer system of claim 1 wherein the global links comprise point-to-point links.

8. The computer system of claim 1 wherein the interconnection controller in each cluster is further operable to uniquely map selected ones of locally generated transactions directed to others of the clusters to a global transaction space, and remotely generated transactions directed to the local nodes to a local transaction space.

9. The computer system of claim 1 wherein selected ones of the local nodes comprise various combinations of corresponding units including any of at least one central processing unit, at least one memory controller, and at least one input/output interface.

10. In a computer system comprising a plurality of processor clusters interconnected by a plurality of global point-to-point links and having a global memory address space associated therewith, each cluster including a plurality of local nodes and an interconnection controller interconnected by a plurality of local point-to-point links, each cluster having a local memory address space associated therewith corresponding to a first portion of the global memory address space, wherein the interconnection controller in each cluster is mapped by the associated local nodes to a remainder portion of the global memory address space exclusive of the first portion, a method for routing locally and remotely generated transmissions, the method comprising:

providing local routing information in each cluster, the local routing information including at least one local routing table maintained by the interconnection controller and relating each of the local nodes to at least one of the local links, a portion of the local routing information being associated with each of the local nodes for facilitating communication between the local nodes and the interconnection controller via specific ones of the local links identified in the portions of routing information;

providing global routing information in each cluster, the global routing information including at least one global routing table maintained by the interconnection controller and relating each of the other clusters to at least one of the global links;

providing memory mapping information maintained by the interconnection controller and relating each of the other clusters to respective portions of the remainder portion of the global memory address space;

mapping locally generated transmissions in each cluster directed to the remainder portion of the global memory address to the global links using the memory mapping information and the global routing information; and mapping remotely generated transmissions directed to the local nodes to the local links using the local routing information.

11. An interconnection controller for use in a computer system comprising a plurality of processor clusters interconnected by a plurality of global point-to-point links and having a global memory address space associated therewith, each cluster including a plurality of local nodes and an instance of the interconnection controller interconnected by a plurality of local point-to-point links, each cluster having a local memory address space associated therewith corresponding to a first portion of the global memory address space, wherein the interconnection controller in each cluster is mapped by the associated local nodes to a remainder portion of the global memory address space exclusive of the first portion, each cluster having routing information associated with each of the local nodes for facilitating communication between the local nodes and the interconnection controller via specific ones of the local links identified in the associated routing information, the interconnection controller comprising circuitry which is operable to maintain at least one local routing table relating each of the local nodes to at least one of the local links, maintain at least one global routing table relating each of the other clusters to at least one of the global links, maintain mapping information relating each of the other clusters to respective portions of the remainder portion of the global memory address space, map locally generated transmissions directed to the remainder portion of the global memory address space the global links using the mapping information and the at least one global routing table, and map remotely generated transmissions directed to the local nodes to the local links using the at least one local routing table.

12. An integrated circuit comprising the interconnection controller of claim 11.

13. The integrated circuit of claim 12 wherein the integrated circuit comprises an application-specific integrated circuit.

14. At least one computer-readable medium having data structures stored therein representative of the interconnection controller of claim 11.

15. The at least one computer-readable medium of claim 14 wherein the data structures comprise a simulatable representation of the interconnection controller.

16. The at least one computer-readable medium of claim 15 wherein the simulatable representation comprises a netlist.

17. The at least one computer-readable medium of claim 14 wherein the data structures comprise a code description of the interconnection controller.

18. The at least one computer-readable medium of claim 17 wherein the code description corresponds to a hardware description language.

* * * * *